United States Patent
Rodriguez

(10) Patent No.: US 7,597,527 B2
(45) Date of Patent: Oct. 6, 2009

(54) SYSTEM AND METHOD FOR TRANSPORTING AN OBJECT IN MULTIPLE DIRECTIONS

(75) Inventor: Samuel J. Rodriguez, Chula Vista, CA (US)

(73) Assignee: Raytheon Company, Waltham, MA (US)

(*) Notice: Subject to any disclaimer, the term of this patent is extended or adjusted under 35 U.S.C. 154(b) by 161 days.

(21) Appl. No.: 11/486,724

(22) Filed: Jul. 14, 2006

(65) Prior Publication Data

US 2008/0014052 A1 Jan. 17, 2008

(51) Int. Cl.
*B66F 11/00* (2006.01)
*E04G 21/14* (2006.01)
*B62B 3/06* (2006.01)
*B66F 5/04* (2006.01)
*B62D 61/12* (2006.01)

(52) U.S. Cl. .................. 414/684.3; 414/11; 254/2 B; 254/3 R; 280/43.17; 105/177; 269/905

(58) Field of Classification Search .............. 254/2 B, 254/3 R, 5 C, 5 R; 414/10–11, 12, 743, 507, 414/428, 467, 917; 280/43, 43.14, 43.17, 280/43.23, 47.131; 105/177; 187/237, 243, 187/244; 267/17
See application file for complete search history.

(56) References Cited

U.S. PATENT DOCUMENTS

| | | | | | |
|---|---|---|---|---|---|
| 1,733,988 | A | * | 10/1929 | Barnard | 414/743 |
| 2,170,607 | A | * | 8/1939 | Green | 414/428 |
| 3,269,744 | A | * | 8/1966 | Dobson | 280/43.17 |
| 3,486,650 | A | * | 12/1969 | Boone | 414/458 |
| 3,540,753 | A | * | 11/1970 | Hanson | 280/47.34 |
| 3,544,127 | A | * | 12/1970 | Dobson | 280/43.17 |
| 3,643,935 | A | * | 2/1972 | Bell | 269/16 |
| 3,923,167 | A | * | 12/1975 | Blankenbeckler | 414/11 |
| 3,977,534 | A | * | 8/1976 | Blake | 414/11 |
| 4,175,899 | A | * | 11/1979 | Tipton | 414/11 |
| 5,269,501 | A | * | 12/1993 | Liegel et al. | 269/17 |
| 5,624,222 | A | * | 4/1997 | Hiatt et al. | 414/11 |
| 6,241,227 | B1 | * | 6/2001 | Berdan et al. | 269/17 |
| 7,014,413 | B2 | * | 3/2006 | Young | 414/743 |

OTHER PUBLICATIONS

"Door Cart helps worker safely install doors", "Hardnox LLC Announces New Door Jak 50 Product Line", ThomasNet Industrial Newsroom, http://news.thomasnet.com, 3 pages, Dec. 4, 2002.
"DoorJak™ 50", DoorJak™ Door Installation Carts, http://www.doorjak.com/_press/DJ50_brochure, 2 pages, Printed Jul. 14, 2006.
"DoorJak™ 100", DoorJak™ Door Installation Carts, http://www.doorjak.com/_press/DJ100_brochure, 2 pages, Printed Jul. 14, 2006.

* cited by examiner

*Primary Examiner*—Gregory W Adams
(74) *Attorney, Agent, or Firm*—Baker Botts L.L.P.

(57) ABSTRACT

According to one embodiment of the present invention, a system operable to transport an object, comprises a frame, a frame transport system, a securing system, an object lift system and a sideways drive system. The frame transport system moves the frame in a plurality of directions comprising a first direction. The securing system couples an object to the frame. The object lift system lifts the object, and comprises at least one pump and at least one cylinder. The sideways drive systems deactivate the frame transport system and moves the frame in a second direction perpendicular to the first direction.

5 Claims, 4 Drawing Sheets

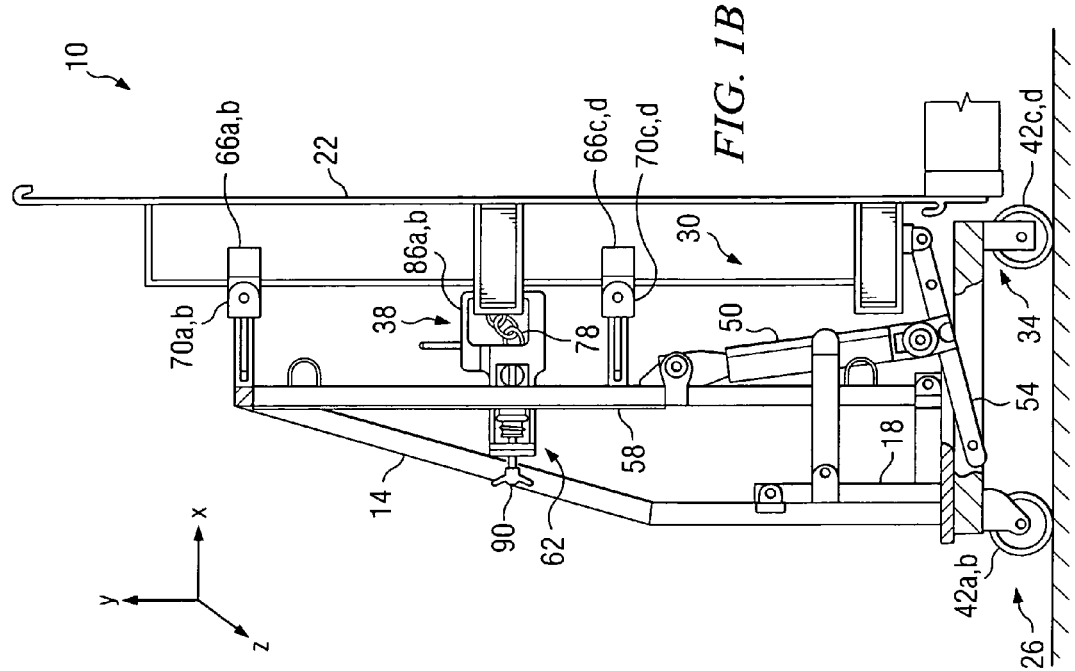
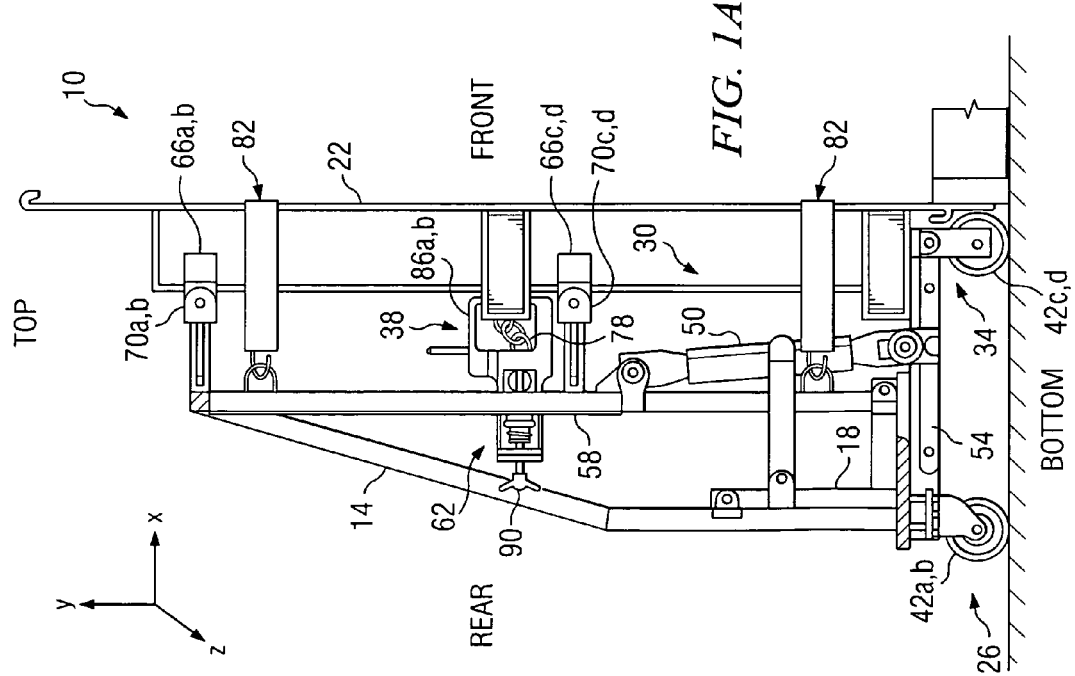

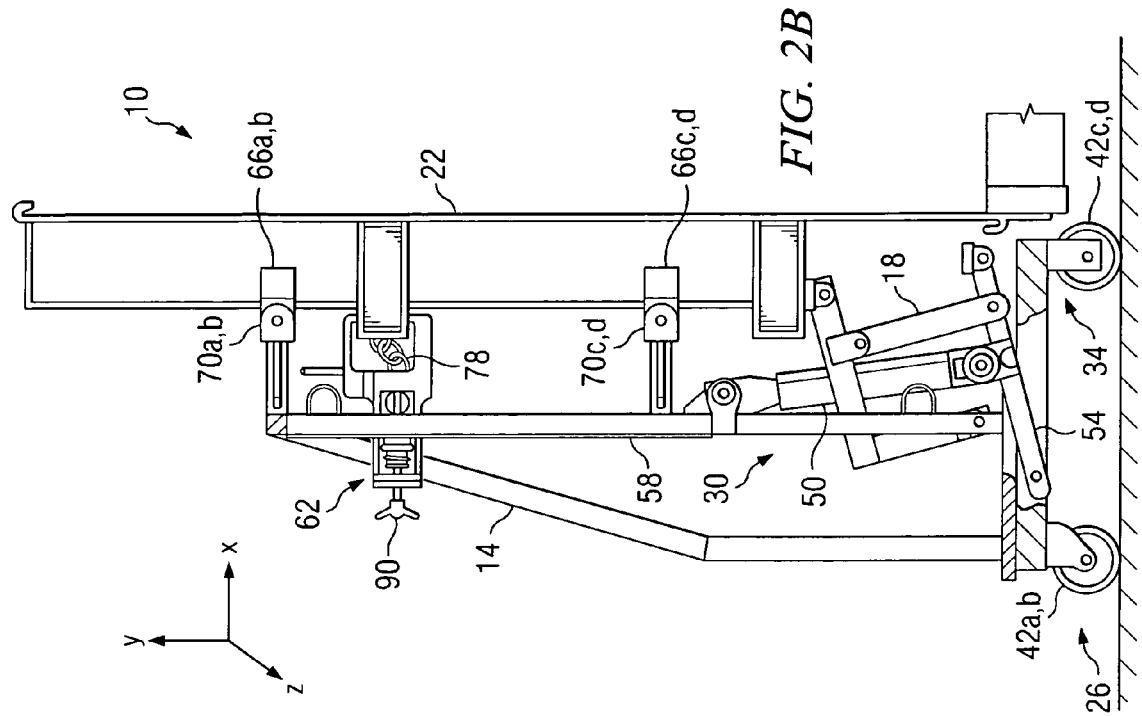
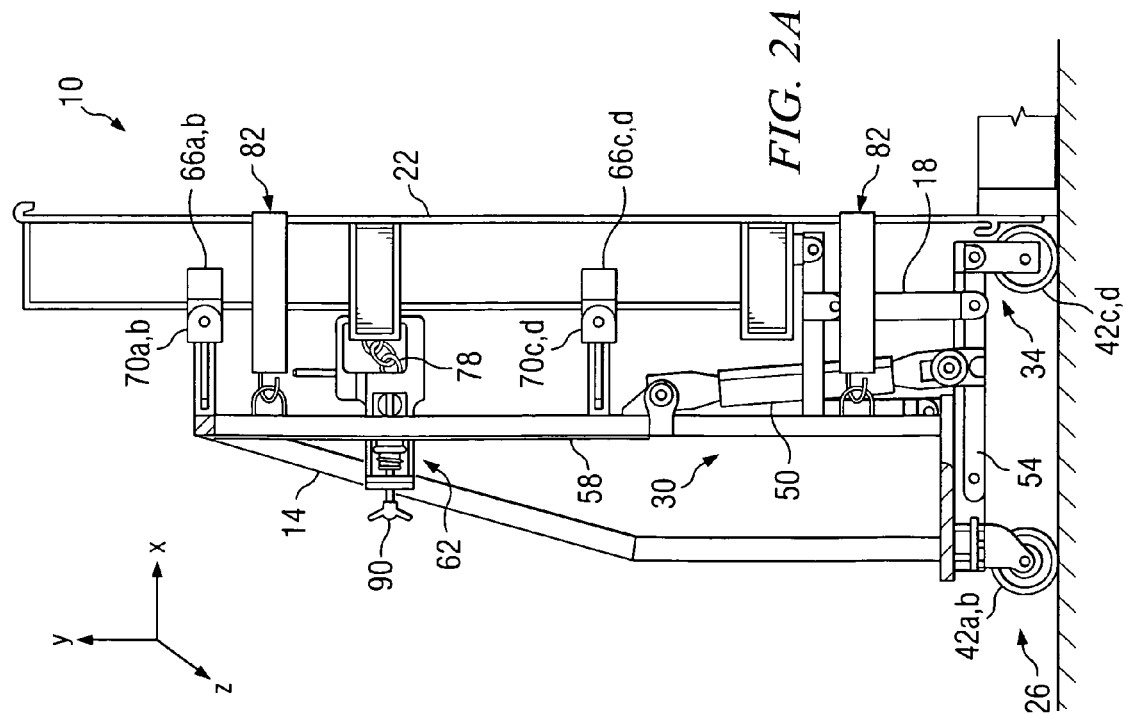

SYSTEM AND METHOD FOR TRANSPORTING AN OBJECT IN MULTIPLE DIRECTIONS

TECHNICAL FIELD OF THE INVENTION

This invention relates generally to the field of transport systems and more specifically to a method and system for transporting an object in multiple directions.

BACKGROUND OF THE INVENTION

A power conditioning module sub-system (PCMS) includes modules designed to test lasers. To conduct such tests in a safe manner, each module is fitted with front and rear blast doors that protect the surroundings of the module.

Standard processes of installing blast doors involve using fork-lifts, electrical powered devices, or door carts to transport the doors. These processes, however, have disadvantages. Some of these known devices are bulky and hard to maneuver, thus posing problems in restricted spaces. Other of these known devices are not able to lift and transport doors as heavy as the blast doors.

SUMMARY OF THE INVENTION

In accordance with the present invention, disadvantages and problems associated with previous techniques for installing blast doors may be reduced or eliminated.

According to one embodiment of the present invention, a system operable to transport an object, comprises a frame, a frame transport system, a securing system, an object lift system, and a sideways drive system. The frame transport system moves the frame in a plurality of directions comprising a first direction. The securing system couples an object to the frame. The object lift system lifts the object, and comprises at least one pump and at least one cylinder. The sideways drive systems deactivates the frame transport system and moves the frame in a second direction perpendicular to the first direction.

Certain embodiments of the invention may provide one or more technical advantages. A technical advantage of one embodiment may be that the sideways drive system allows for moving an object in a first direction and then in a second direction perpendicular to the first. This may allow for increased maneuverability without requiring a user to apply torque to the invention. A further technical advantage of one embodiment may be that the object lift system allows for raising and lowering a heavy object. This may allow for an object to be placed at a specific height.

Certain embodiments of the invention may include none, some, or all of the above technical advantages. One or more technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which:

FIG. 1A is a side view of an embodiment of a system operable to transport an object;

FIG. 1B is a side view of an embodiment of the system operable to transport an object;

FIG. 2A is a side view of an embodiment of the system operable to transport an object;

FIG. 2B is a side view of an embodiment of the system operable to transport an object;

DETAILED DESCRIPTION OF THE INVENTION

Figure 3:
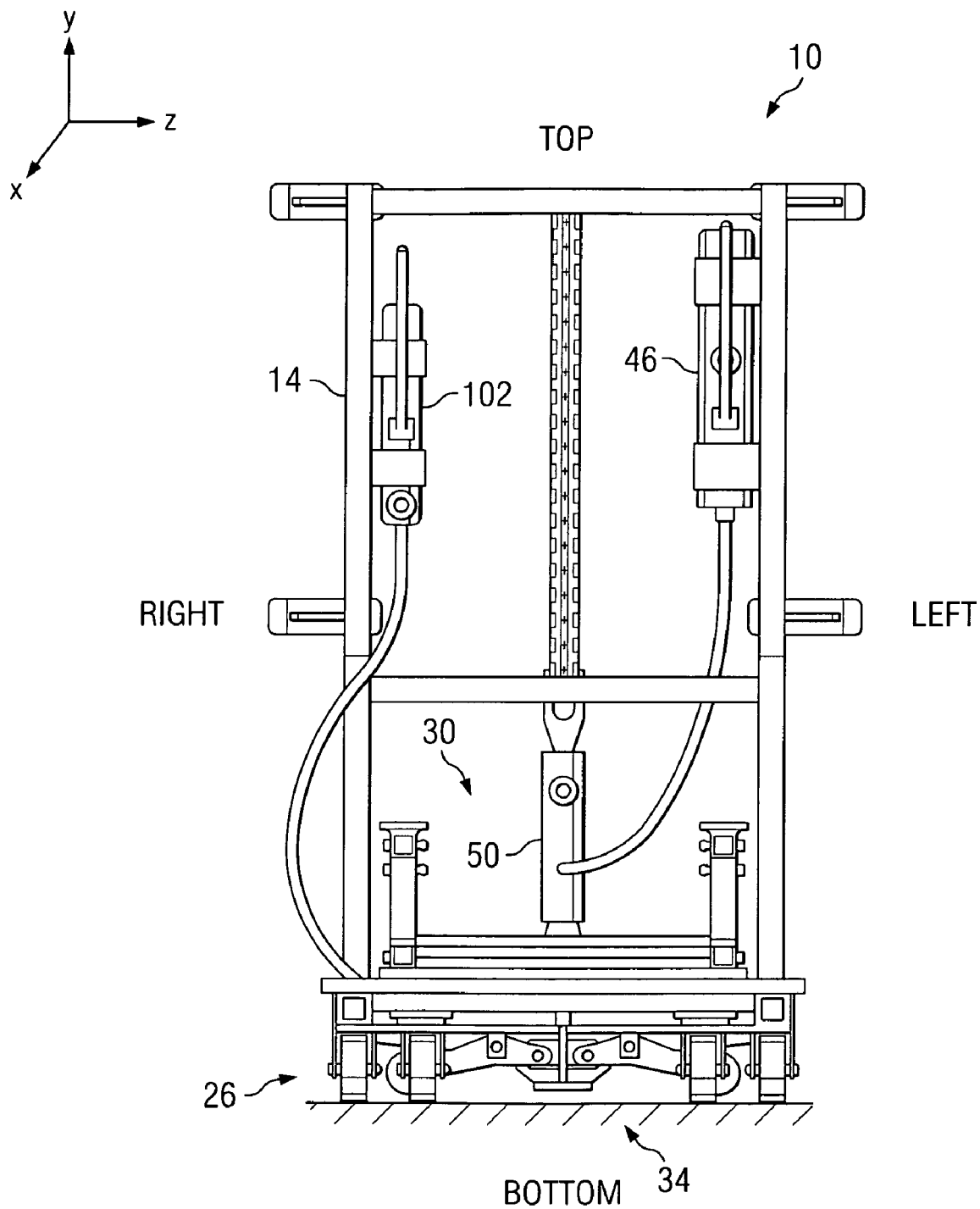
FIG. 3 is a rear view of an embodiment of the system operable to transport an object.

Embodiments of the present invention and its advantages are best understood by referring to FIGS. 1 through 5 of the drawings, like numerals being used for like and corresponding parts of the various drawings.

FIGS. 1A and 1B are side views of an embodiment of a system 10 operable to transport an object. According to the embodiment, system 10 comprises a sideways drive system 34 and an object lift system 30. Sideways drive system 34 allows system 10 to move an object in a first direction and then in a second direction perpendicular to the first. This feature may allow for increased maneuverability without requiring a user to apply torque to system 10. Object lift system 30 allows system 10 to raise and lower a heavy object. This feature may allow system 10 to place an object at a specific height.

According to the illustrated embodiment, system 10 is shown with reference to x, y, and z axes. The x axis corresponds to the direction from the rear to the front of frame 14 of system 10. The y axis corresponds to the direction from the bottom to the top of frame 14. The z axis corresponds to the direction from the right side to the left side of frame 14.

System 10 may be used to transport any suitable object 22. An object 22 may refer to a solid entity comprising any suitable material. Object 22 may have any suitable object geometry such as any suitable shape, size, dimension, and weight. In one embodiment, object 22 may comprise a cement slab, a side panel, a window, or a door. In the illustrated embodiment, object 22 comprises a blast door. The blast door may have dimensions between 4 to 9 feet high, 2 to 6 feet wide, 0.5 to 2.5 feet deep, and may weigh between 200 to 2,000 pounds. According to this particular embodiment, the blast door is approximately 7 feet high by 4 feet wide by 1 foot deep and weighs approximately 1,200 pounds In this particular embodiment, system 10 may be used to transport the blast door to a laser testing module. System 10 may raise the door to a height at which the door can be installed on the module. This installation process may be accomplished without the use of any other device other than system 10.

According to the illustrated embodiment, system 10 includes a frame 14. Frame 14 may be of any suitable type and have any suitable geometry. For example, frame 14 comprises a rigid structure having a size and shape to support one or more components of system 10. The size of frame 14 may be between 5 to 8 feet tall, 2 to 6 feet wide, 4 to 6 feet deep, and the weight may be between 600 and 1,000 pounds. In the illustrated embodiment, frame 14 comprises a steel structure approximately 6 feet tall by 4 feet wide by 4 feet deep, and weighing approximately 850 pounds In this particular embodiment, frame 14 is capable of supporting over 1,500 pounds, such as 1,800 pounds.

Frame 14 comprises an extension assembly 18 operable to configure frame 14 to support different shapes of object 22.

According to one embodiment, extension assembly 18 may be placed in one position to support object 22 of one shape and in another position to support object 22 of another shape. For example, extension assembly 18 may be placed in a first position for a front blast door and in a second position for a rear blast door. In the illustrated embodiment, extension assembly 18 is placed in a position away from the front blast door to configure frame 14 to support the front blast door.

FIGS. 2A and 2B are side views of system 10 with extension assembly 18. Extension assembly 18 is rotated to the second position to support the rear blast door. In the second position, extension assembly 18 may be positioned underneath the rear blast door to configure frame 14 to support the rear blast door.

Referring back to FIGS. 1A and 1B, system 10 also includes a frame transport system 26, an object lift system 30, a sideways drive system 34, and a securing system 38 coupled to frame 14 as shown.

Frame transport system 26 is operable to move frame 14 in one or more directions comprising a first direction. According to the illustrated embodiment, a first direction comprises a direction along the x axis. In the illustrated embodiment, frame transport system 26 comprises a plurality of wheels 42*a-d* operable to move frame 14. Wheels 42*a-d* may comprise any suitable material and have any suitable size or shape. For example, wheels 42*a-d* may comprise polyurethane, and have a cylindrical shape with a diameter of 5 to 7 inches, such as 6 inches, and a width of 2 to 3 inches, such as 2.5 inches. Wheels 42*a-b* may be similar to or different from wheels 42*c-d*. In one embodiment, wheels 42*c-d* may move in substantially one linear direction with respect to frame 14, and wheels 42*a-b* may pivot with respect to frame 14, allowing for movement in more directions.

Modifications, additions, or omissions may be made to frame transport system 26 without departing from the scope of the invention. The components of frame transport system 26 may be integrated or separated according to particular needs. Moreover, the operations of frame transport system 26 may be performed by more, fewer, or other components. For example, the operations of wheels 42*a-d* may be performed by other components. As used in this document, "each" may refer to each member of a set or each member of a subset of the set.

Object lift system 30 lifts object 22. According to one embodiment, object lift system 30 may lift object 22 from a resting position on frame 14 to a desired height. Object lift system 30 is discussed further in conjunction with FIG. 3.

Sideways drive system 34 is operable to move frame 14 in a second direction perpendicular to the first direction of the movement of frame transport system 26. According to one embodiment, sideways drive system 34 may deactivate frame transport system 26 by lifting frame 14 prior to moving frame 14. Sideways drive system 34 is discussed further in conjunction with FIGS. 4A and 4B.

Securing system 38 secures object 22 to frame 14, allowing object 22 to be transported, lifted, and lowered. According to the illustrated embodiment, securing system 38 comprises a rail guide 58, an object clamping subsystem 62, object guides 66*a-d*, object stabilizers 70*a-d*, and back-up object clamping subsystems 78 and 82.

Object clamping subsystem 62 moves up and down in a vertical direction along rail guide 58. Object clamping subsystem 62 may be moved to a specific height to secure a specific size of object 22, and may secure object 22 to frame 14 during movement of object 22. Object clamping subsystem 62 may work in conjunction with object lifting system 30 to lift object 22. In the illustrated embodiment, object clamping subsystem 62 comprises clamps 86*a-b* coupled to a clamp adjustment wheel 90. By manually lowering each top arm of clamps 86*a-b*, the arms of clamps 86*a-b* lock into place, applying pressure to object 22. In this embodiment, clamps 86*a-b* apply pressure to the lip of a blast door. After applying pressure to object 22, object 22 may be pulled up against object stabilizers 70*a-d* by rotating clamp adjustment wheel 90 in one direction. Rotating clamp adjustment wheel 90 in the other direction causes object 22 to be pushed away from object stabilizers 70*a-d*. By manually unlocking and raising each top arm of clamps 86*a-b*, clamps 86*a-b* release the pressure on object 22, allowing system 10 to separate from object 22.

Object stabilizers 70*a-d* are capable of keeping the object horizontally level. Object stabilizers 70*a-d* are discussed in further detail in correlation with FIG. 5. Object guides 66*a-d* are capable of keeping object 22 substantially balanced on frame 14. Object guides 66*a-d* are discussed in further detail in correlation with FIG. 5.

Back-up object clamping subsystems 78 and 82 secure object 22 to frame 14 and may secure object 22 in the event of the failure of object clamping subsystem 62. None, one, or both subsystems may be used at any suitable time. For example, back-up object clamping subsystem 78 may be used while object 22 is lifted or lowered by object lift system 30. Back-up object clamping subsystem 82 may be used while object 22 is being transported. When object 22 is lowered or lifted by object lift system 30, back-up object clamping subsystem 82 need not be used.

Back-up object clamping subsystem 82, in one particular embodiment, comprises straps. These straps attach to frame 14 on one side, wrap around object 22, and attach back to frame 14 on the other side. Back-up object clamping subsystem 78, in one embodiment, comprises a safety chain attached to object 22. For example, in the illustrated embodiment, the safety chain attaches to the lip of the blast door, securing the blast door to frame 14.

Modifications, additions, or omissions may be made to securing system 38 without departing from the scope of the invention. The components of securing system 38 may be integrated or separated according to particular needs. Moreover, the operations of securing system 38 may be performed by more, fewer, or other components. For example, the operations of back-up object clamping subsystem 82 may be performed by more than one component.

Modifications, additions, or omissions may be made to system 10 without departing from the scope of the invention. The components of system 10 may be integrated or separated according to particular needs. Moreover, the operations of system 10 may be performed by more, fewer, or other components. For example, the operations of securing system 38 may be performed by other components.

FIG. 3 comprises a rear view of an embodiment of system 10 with sideways drive system 34 and object lift system 30. Sideways drive system 34 is operable to move frame 14 in a second direction perpendicular to the first direction of the movement of frame transport system 26. Sideways drive system 34 is discussed further in conjunction with FIGS. 4A and 4B.

Object lift system 30 allows system 10 to lift object 22. In one embodiment, object lift system 30 allows system 10 to raise object 22 to a specific height. Lift system 30 may lift an object 22 of any suitable weight, such as over 1,000 pounds, for example, 1,200 pounds. In the illustrated embodiment, object lift system 30 is capable of lifting a 1,200 pound blast door to a height to install the door on a laser testing module. In the illustrated embodiment, object lift system 30 comprises a pump 46, a cylinder 50, and a lift bar 54 (shown in FIGS. 1A, 1B, 2A, and 2B) coupled to frame 14.

Pump 46 is operable to activate cylinder 50. Pumping pump 46 causes pressure to build up in cylinder 50 to activate cylinder 50. Pump 46 may comprise any suitable pump. For instance, pump 46 may comprise an electric pump, a mechanical pump, or a hydraulic pump. In the illustrated embodiment, pump 46 comprises a manual hydraulic pump.

Cylinder 50 is operable to raise lift bar 54. In one embodiment, pump 46 increases the pressure in cylinder 50, causing cylinder 50 to apply a force to lift bar 54. The force causes lift bar 54 to pivot upwards, raising object 22. In a further embodiment, object 22 is lowered from a raised position by releasing pressure in cylinder 50. As the pressure in cylinder 50 decreases, the weight of object 22 causes lift bar 54 to pivot to a resting position, lowering object 22. Cylinder 50 may comprise any suitable cylinder. For example, cylinder 50 may comprise a push cylinder or a pull cylinder. In the illustrated embodiment, cylinder 50 comprises a pull cylinder.

In a further embodiment, lift bar 54 may comprise extension assembly 18. According to one embodiment, when extension assembly 18 is in a first position, lift bar 54 may be operable to lift object 22 of one shape. When extension assembly 18 is in a second position, lift bar 54 may be operable to lift object 22 of another shape. FIG. 2B illustrates extension assembly 18 in a second position for a rear blast door. In the second position, extension assembly 18 may be coupled to lift bar 54 and positioned underneath object 22, allowing lift bar 54 to lift object 22.

Modifications, additions, or omissions may be made to object lift system 30 without departing from the scope of the invention. The components of object lift system 30 may be integrated or separated according to particular needs. Moreover, the operations of object lift system 30 may be performed by more, fewer, or other components. For example, the operations of pump 46 may be performed by more than one component.

Figure 4A:
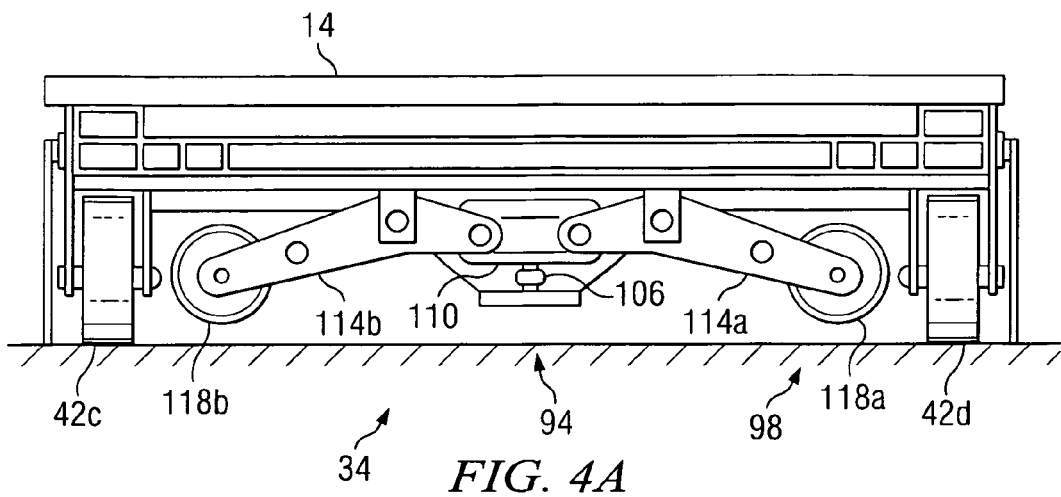
FIG. 4A is a front view of an embodiment of the system operable to transport an object.
Figure 4B:
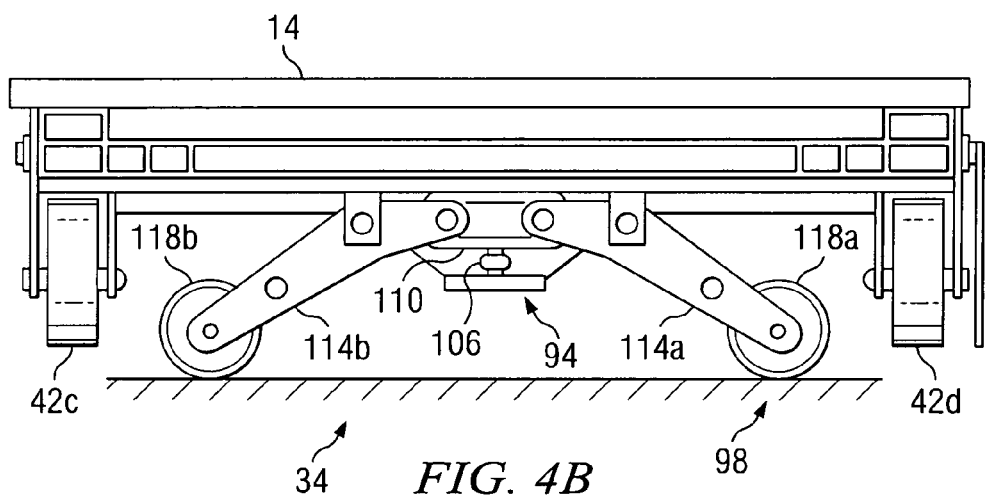
FIG. 4B is a front view of an embodiment of the system operable to transport an object.

FIGS. 4A and 4B are front views of sideways drive system 34 operable to move frame 14 in a second direction perpendicular to the first direction of the movement of frame transport system 26. According to one embodiment, sideways drive system 34 may deactivate frame transport system 26 by lifting frame 14 prior to moving frame 14.

In the illustrated embodiment, sideways drive system 34 comprises a frame lift subsystem 94 coupled to frame 14 and a sideways transport subsystem 98 coupled to frame lift subsystem 94. Frame lift subsystem 94 is operable to lift frame 14, deactivating frame transport system 26. According to the illustrated embodiment, frame lift subsystem 94 comprises a lift pump 102, a lift cylinder 106, a block 110, and articulated arms 114a-b.

Lift pump 102 is operable to activate lift cylinder 106. Pumping lift pump 102 causes pressure to build up in lift cylinder 106, activating lift cylinder 106. Lift pump 102 may comprise any suitable pump. For instance, lift pump 102 may comprise an electric pump, a mechanical pump, or a hydraulic pump. In the illustrated embodiment, lift pump 102 comprises a manual hydraulic pump.

Lift cylinder 106 is operable to raise block 110. In one embodiment, the pressure in lift cylinder 106 causes lift cylinder 106 to apply force to block 110, raising block 110. Lift cylinder 106 may comprise any suitable cylinder. For example, lift cylinder 106 may comprise a push cylinder or a pull cylinder. In the illustrated embodiment, lift cylinder 106 comprises a push cylinder.

Block 110 is operable to lower articulated arms 114a-b. As block 110 is raised by lift cylinder 106, block 110 lowers articulated arms 114a-b. By lowering articulated arms 114a-b below the vertical position of wheels 42c-d, articulated arms 114a-b raise frame 14, deactivating frame transport system 26. In another embodiment, releasing pressure from lift cylinder 106 lowers block 110. As block 110 is lowered, block 110 raises articulated arms 114-b above the vertical position of wheels 42c-d. This lowers frame 14, reactivating frame transport system 26.

Sideways transport subsystem 98 is operable to move frame 14 in a second direction perpendicular to the first direction of the movement of frame transport system 26. In the embodiment illustrated in FIGS. 1A and 3, the second direction comprises a direction along the z axis.

Referring back to FIGS. 4A and 4B, once frame 14 is lifted, deactivating transport system 26, sideways transport system 98 may be operable to move frame 14. In the illustrated embodiment, sideways transport subsystem 98 comprises wheels 118a-b coupled to articulated arms 114a-b. Wheels 118a-b may comprise any suitable material and have any suitable size or shape. For example, wheels 118a-b may comprise polyurethane, and have a cylindrical shape with a diameter of approximately 6 inches and a width of approximately 2.5 inches. In one embodiment, wheels 118a-b may move in substantially one linear direction with respect to frame 14.

Modifications, additions, or omissions may be made to sideways drive system 34 without departing from the scope of the invention. The components of sideways drive system 34 may be integrated or separated according to particular needs. Moreover, the operations of sideways drive system 34 may be performed by more, fewer, or other components. For example, the operations of lift pump 102 may be performed by more than one component.

Figure 5:
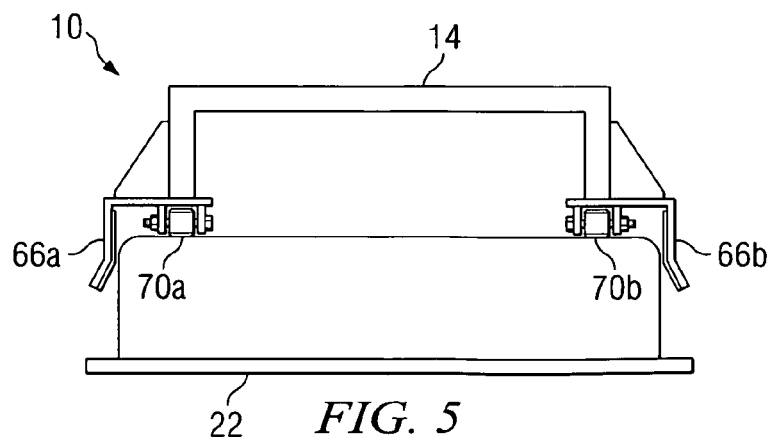
FIG. 5 is a top view of an embodiment of the system operable to transport an object.

FIG. 5 is a top view of system 10 with object guides 66a-d and object stabilizers 70a-d coupled to frame 14. Object guides 66a-d are operable to keep object 22 substantially balanced on frame 14. For example, when object 22 is placed on frame 14, object guides 66a-d may act as a guiding system to prevent object 22 from moving to either side of frame 14. By keeping object 22 substantially balanced on frame 14, object guides 66a-d may prevent system 10 from tipping.

Object stabilizers 70a-d are operable to keep object 22 horizontally level. For example, after object 22 is placed on system 10, object stabilizers 70a-d may be operable to prevent object 22 from shifting horizontally and possibly dislodging from the object clamping subsystem 62. Object stabilizers 70a-d may comprise any suitable type of stabilizer. For example, object stabilizers 70a-d may comprise cushions, bumpers, wheels, or rollers. In the illustrated embodiment, object stabilizers 70a-d comprise rollers.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A system operable to transport an object, comprising:
   a frame, the frame comprising an extension assembly, the extension assembly operable to configure the frame to support a plurality of different object geometries, the object comprising a door, the door having dimensions between 4 to 9 feet high, 2 to 6 feet wide, 0.5 to 2.5 feet deep, and weighing between 200 to 2,000 pounds;
   a frame transport system coupled to the frame, the frame transport system operable to move the frame in a plurality of directions, the plurality of directions comprising a first direction, the frame transport system comprising a plurality of wheels, a wheel operable to rotate to move the frame;

a securing system coupled to the frame, the securing system comprising an object clamping subsystem coupled to a rail guide, an object guide coupled to the frame, an object stabilizer coupled to the frame, and one or more back-up object clamping subsystems coupled to the frame, the object clamping subsystem operable to couple the object to the frame, and move along the rail guide, the object guide operable to keep the object substantially balanced on the frame, the object stabilizer operable to keep the object horizontally level, the back-up object clamping subsystem operable to couple the object to the frame if there is a failure of the securing system, the back-up object clamping subsystem comprising a harness, the harness coupled to the frame and operable to couple the object to the frame;

an object lift system coupled to the frame, the object lift system comprising at least one pump and at least one cylinder, the object lift system operable to lift the object, the object lift system independent of the securing system, the pump comprising a manual hydraulic pump;

a sideways drive system coupled to the frame, the sideways drive system comprising a frame lift subsystem coupled to the frame, and a sideways transport system coupled to the frame lift subsystem, the sideways transport subsystem operable to move the frame in the second direction, the sideways transport subsystem comprising one or more wheels, a wheel operable to rotate to move the frame, the frame lift subsystem operable to lift the frame to deactivate the frame transport system, the frame lift subsystem comprising:

at least one lift pump coupled to the frame;

at least one lift cylinder coupled to a lift pump of the at least one lift pump;

at least one block coupled to a lift cylinder of the at least one lift cylinder;

at least one articulated arm coupled to a block of the at least one block;

wherein:

the lift pump is operable to activate the lift cylinder;

the lift cylinder is operable to lift the block;

the block is operable to lower an articulated arm of the at least one articulated arm; and the articulated arm is operable to lift the frame.

2. The system of claim 1, wherein the object clamping subsystem comprises a plurality of clamps operable to apply pressure to the object in order to couple the object to the frame.

3. The system of claim 1, wherein the object lift system is further operable to lift the object using an upward pivoting motion.

4. The system of claim 3, wherein the object lift system is further operable to lift the object without pivoting the object.

5. The system of claim 1, wherein the door comprises a blast door.

* * * * *